United States Patent [19]

Schaefer et al.

[11] 4,220,197

[45] Sep. 2, 1980

[54] HIGH SPEED VARIABLE DELIVERY HELICAL SCREW COMPRESSOR/EXPANDER AUTOMOTIVE AIR CONDITIONING AND WASTE HEAT ENERGY RECOVERY SYSTEM

[75] Inventors: Donald D. Schaefer, Farmington; David N. Shaw, Unionville; Joseph A. M. Gagnon, Windsor Locks, all of Conn.

[73] Assignee: Dunham-Bush, Inc., West Hartford, Conn.

[21] Appl. No.: 601

[22] Filed: Jan. 2, 1979

[51] Int. Cl.² ............................................. B60H 3/00
[52] U.S. Cl. ........................................ 165/35; 62/238; 62/323; 165/43
[58] Field of Search .................. 62/323 R, 467, 238 C, 62/226; 417/315, 237; 165/35, 43; 60/618

[56] References Cited

U.S. PATENT DOCUMENTS

2,869,332  1/1959  Keller .............................. 62/323 X
3,936,239  2/1976  Shaw ............................... 417/315

*Primary Examiner*—William E. Wayner
*Attorney, Agent, or Firm*—Sughrue, Rothwell, Mion, Zinn and Macpeak

[57] ABSTRACT

A compact, helical screw compressor/expander unit mounted in a vehicle and connected to the vehicle engine driven drive shaft has inlet and outlet ports and a capacity control slide valve and a pressure matching or volume ratio slide valve, respectively, for said ports. A refrigerant loop includes the compressor, a condenser mounted in the path of air flow over the engine and an evaporator mounted in a fresh air/cab return air flow duct for the occupant. Heat pipes thermally connect the cab air flow duct to the engine exhaust system which also bears the vapor boiler. Selectively operated damper valves control the fresh air/cab return air for passage selectively over the evaporator coil and the heat pipes as well as the exhaust gas flow over opposite ends of the heat pipes and the vapor boiler.

23 Claims, 9 Drawing Figures

FIG. 4a DUAL A/C — WASTE HEAT SYSTEM — A/C MODE

FIG. 4b  DUAL A/C — WASTE HEAT SYSTEM —
A/C MODE WITH PULL DOWN

FIG. 4c   DUAL A/C – WASTE HEAT SYSTEM – RECOVERY MODE

FIG. 4d  DUAL A/C — WASTE HEAT SYSTEM — HEAT MODE (ABOVE 40°F AMB.)

FIG. 4e DUAL A/C – WASTE HEAT SYSTEM –
HEAT MODE (BELOW 40°F AMB. – PARTIAL RECOVERY)

HIGH SPEED VARIABLE DELIVERY HELICAL SCREW COMPRESSOR/EXPANDER AUTOMOTIVE AIR CONDITIONING AND WASTE HEAT ENERGY RECOVERY SYSTEM

FIELD OF THE INVENTION

This invention relates to vehicle mounted air conditioning systems and more particularly, to a vehicle mounted air conditioning system having the capability to recover waste engine heat and effectively improve the coefficient of performance of the air conditioning system.

BACKGROUND OF THE INVENTION

Automobile air conditioning has become so prevalent that today such systems are considered necessities rather than luxuries in the automotive field. However, with the necessity to conserve fuel, improvements are demanded in automotive air conditioning systems to improve the efficiency of the air conditioning equipment.

Further, since a large amount of thermal energy is wasted in the heat of exhaust, attempts have been made to recover some of the thermal energy and provide either mechanical boost to the vehicle drive system or to improve operation of the vehicle by regenerative thermal heat exchange.

In recent years, there has developed a helical screw rotary compressor which incorporates a plurality of reciprocating slide valves for improving compressor operation and for matching compressor operating parameters to system operating parameters for maximizing both the efficiency of the compressor and the system within which it is employed. Further, the helical screw compressors incorporating multiple slide valves have been capable of operating either as compressors, that is, for compressing a working fluid by the utilization of mechanical energy input or as expanders, where the working fluid at high pressure expands within the unit, driving the intermeshed helical screw rotors to provide useful mechanical output. Such helical screw compressor/expander machines having multiple slide valves are shown in U.S. Pat. No. 3,936,239 assgined to the common assignee.

Additionally, in order to effect heat transfer between regions having a temperature differential, in recent times, there has developed high efficiency heat pipes which constitute structural elements of an elongated nature and permitting the migration of a vaporizable working fluid from one end to the other in vapor form, condensation at said other end and by capillary action, movement of the condensed vapor to said one end for revaporization, thereby transmitting heat from said one end to said other end.

It is, therefore, a primary object of the present invention to provide an improved vehicle mounted air conditioning system, which provides air conditioning during the summer months with improved system coefficient of performance and which permits the recovery of waste heat both in terms of enhancing occupant cab heating during the winter months or the simple conversion of thermal energy to mechanical form during periods when air conditioning is not required.

It is a further object of the present invention to provide an improved, helical screw rotary compressor/expander unit which achieves high thermal efficiency air conditioning of an automotive vehicle bearing the compressor/expander unit and which permits a pull down evaporator to be employed in conjunction with the conventional refrigeration system evaporator with the evaporators operating at different pressures during cab temperature pull down upon initiation of vehicle air conditioning mode.

It is a further object of the present invention to provide an improved helical screw rotary compressor/expander unit which is coupled to a prime mover and which operates to drive the prime mover when acting as an expander and to be driven when acting as a compressor, and wherein the unit incorporates capacity control and volume ratio slide valves associated with the working fluid vapor inlet and outlet to the unit working chamber, with the inlet always receiving working fluid regardless of whether the unit is operating as a compressor or expander, and wherein the volume ratio slide valve may provide maximum volume ratio when the unit acts as a compressor and minimum volume ratio when the unit acts as an expander.

SUMMARY OF THE INVENTION

One aspect of the present invention is directed to an improved air conditioning and waste heat recovery system for an engine driven automotive vehicle, the automotive vehicle including an occupant cab to be air conditioned, an engine driven drive shaft, an engine exhaust gas passage, and a cab air passage leading to the cab. The improvement comprises a helical screw compressor/expander unit including intermeshed helical screw rotors, one of the rotors being connected to the drive shaft to be driven thereby during compressor operation and for driving the shaft during expander operation. The compressor/expander unit further includes inlet and outlet ports, a capacity control slide valve carried by the unit for controlling working fluid entering the compression chamber and a volume ratio, slide valve or pressure matching slide valve for controlling the volume ratio for the compressor/expander unit and/or matching the pressure of the working chamber at the outlet just before discharge to outlet port pressure. The exhaust gas passage includes a boiler. A first coil functioning as refrigerant condenser is mounted preferably in the air flow stream over the engine. A second coil functioning as the system evaporator is mounted within the fresh air passage. Conduit means are provided for fluid connecting the vapor boiler, the compressor/expander unit at the inlet and outlet ports and the condenser and the evaporator in a closed loop refrigeration circuit, with the conduit means carrying a refrigerant working fluid and the conduit means further including a cycle control valve for controlling the unit to permit the unit to act selectively as a compressor or expander and for controlling working fluid flow to and from the first and second coils. Passive heat exchange means are provided between the fresh air and exhaust gas passages for permitting waste heat to heat the fresh air entering the cab. First bypass means are provided within the engine exhaust gas passage for selectively bypassing exhaust gas about the vapor boiler or the passive heat exchange means. Second bypass means are provided within the air passage leading to the cab for selectively causing the air entering the cab, when the cab requires air conditioning, to bypass the passive heat exchange means and for permitting waste heat of the exhaust gas to heat the air entering the cab absent evaporator operation of the second coil when the cab requires heat, and wherein operation of the first bypass means to selectively bypass exhaust gas about the passive heat exchange means and directing the exhaust gas to the vapor boiler, causes the exhaust gas to vaporize the working fluid within the vapor boiler and for driving the helical screw compressor/expander unit as an expander under control of the cycle control valve to positively drive the drive shaft and to thereby further recover thermal energy from the exhaust gas.

Preferably, the second slide valve comprises a volume ratio slide valve and means are provided for shifting the second slide valve between first and second extreme positions. The first extreme position constitutes a maximum volume ratio position for the helical screw compressor/expander unit when operating as a compressor and the second position constitutes a minimum volume ratio position for the compressor/expander unit when the unit is functioning as an expander. Alternately, the second slide valve comprises a pressure matching slide valve including means for sensing the pressure of the working fluid within a closed thread just before discharge to the outlet port and means for comparing that pressure to system pressure at the outlet port and means for shifting the pressure matching slide valve to a position where the pressures are equalized to prevent overcompression and undercompression of the refrigerant working fluid when the unit is operating as a compressor and overexpansion and underexpansion when acting as an expander.

DESCRIPTION OF THE PREFERRED EMBODIMENT

Figure 1:
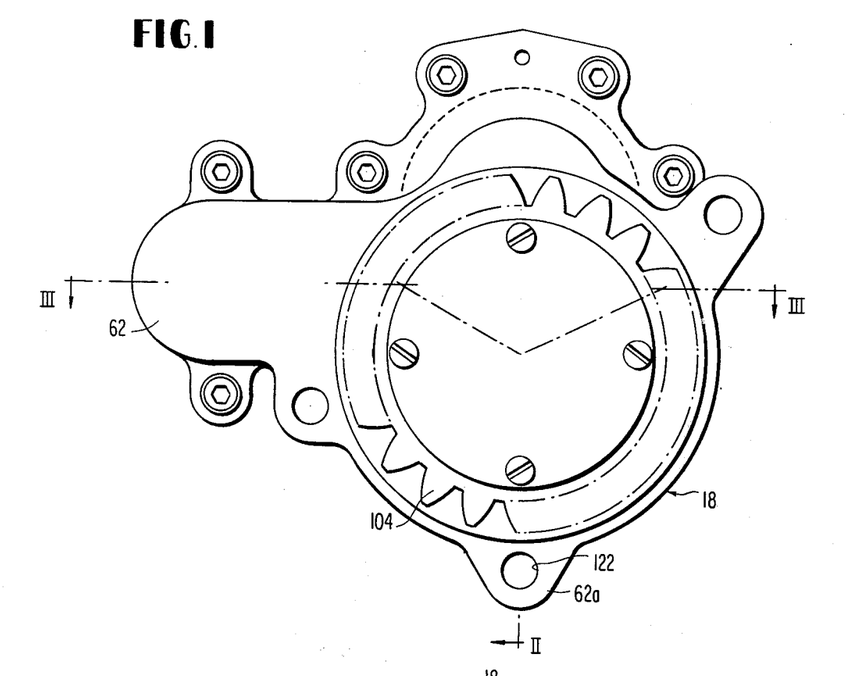
FIG. 1 is an end view of the compact, helical screw rotary compressor/expander unit forming a major component of the automotive vehicle air conditioning and waste heat energy recovery system of the present invention.
Figure 2:
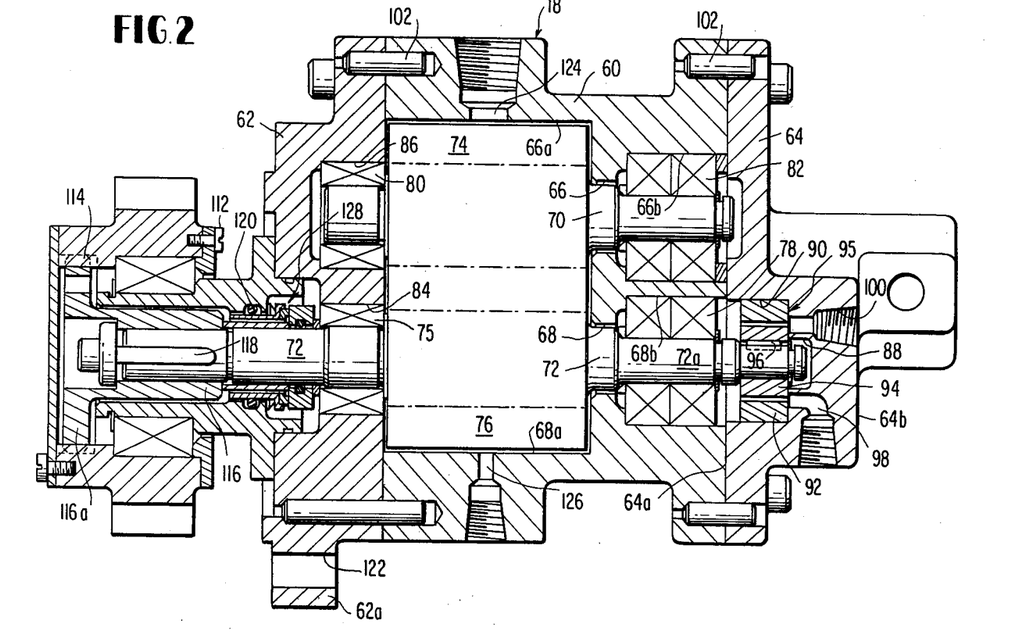
FIG. 2 is a vertical, sectional view of the unit of FIG. 1 taken about line II—II.
Figure 3:
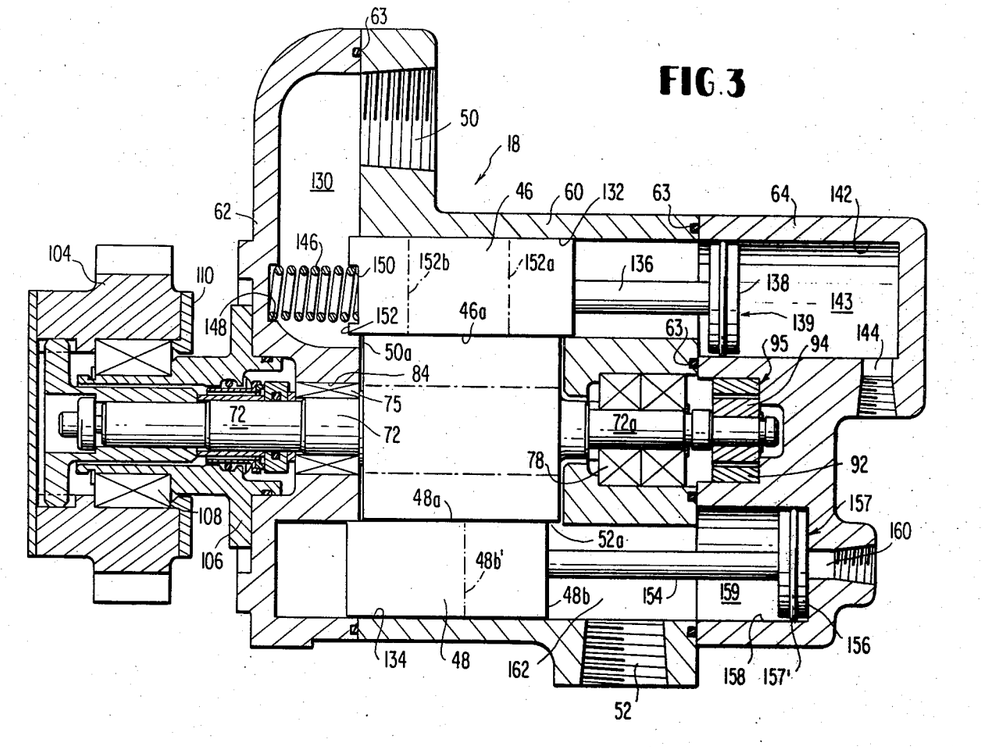
FIG. 3 is a modified, horizontal sectional view of the unit of FIG. 1 taken about line III—III.

FIGS. 1-3 inclusive show in a preferred form a compact and highly improved compressor/expander of the rotary, helical screw type which is employed in a high speed, variable delivery automotive air conditioning and waste heat energy recovery system as indicated generally at 10, FIGS. 4a-4e for a vehicle comprised of a cab 12. The system is highly useful for air conditioning the driver cab for tractor trailer units and the like. Alternatively, the system may be employed in a passenger automobile type vehicle.

Figure 4A:
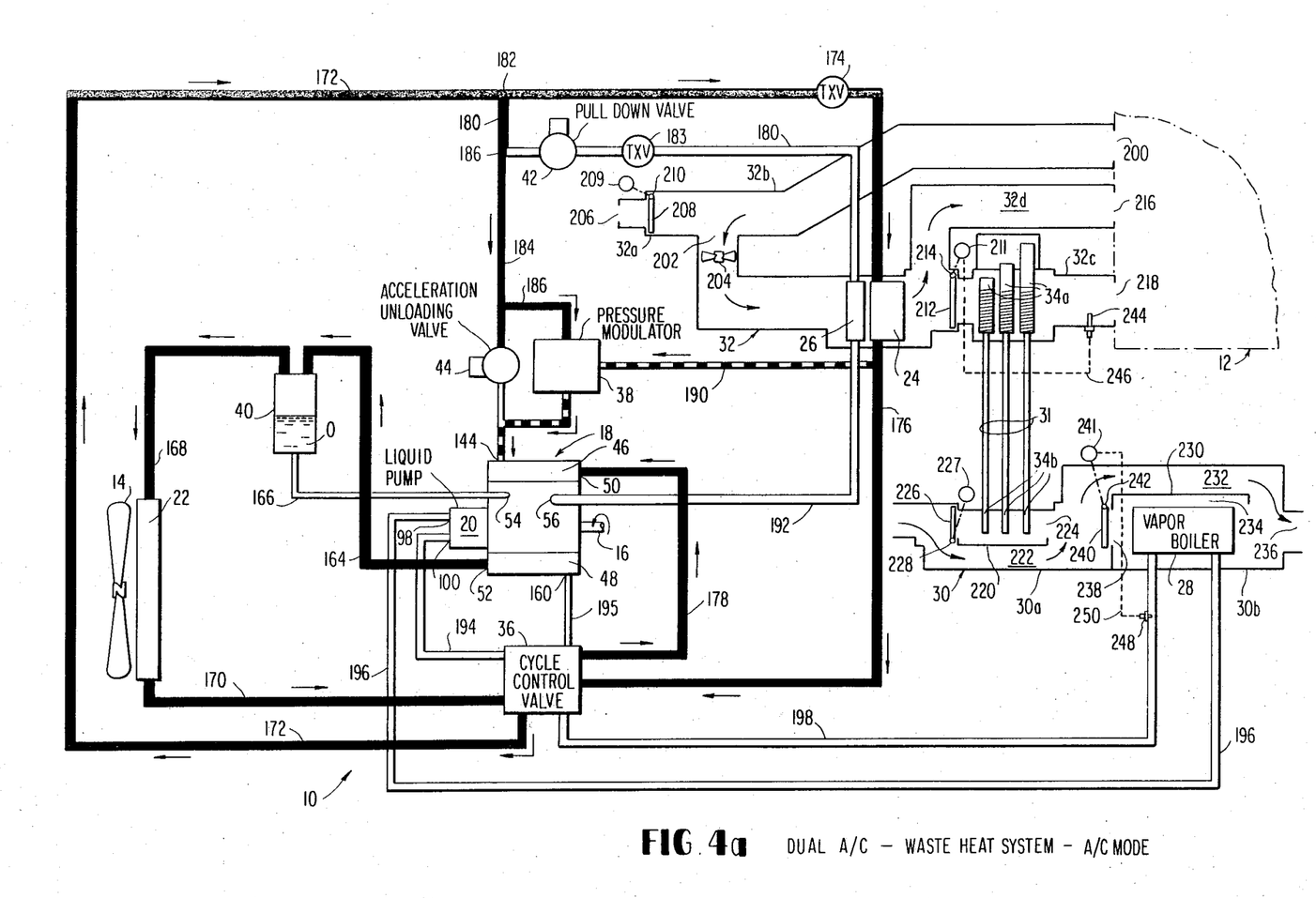
FIG. 4a is a schematic diagram of the helical screw compressor/expander automotive air conditioning and waste heat energy recovery system employing the unit of FIGS. 1-3 inclusive and forming one embodiment of the present invention, operating under air conditioning mode.

Insofar as vehicle components are concerned, the vehicle, FIG. 4a, includes an engine driven fan 14, normally at the front of the vehicle engine (not shown) and forcing air over various heat exchange coils including the engine radiator (not shown) for cooling of the same. The vehicle engine (not shown) includes drive shaft 16, which is coupled to a rotary helical screw compressor/expander unit indicated generally at 18. Additionally, an auxiliary pump 20 may circulate a working fluid within the various conduit means forming the refrigerant connections between certain components of the closed loop refrigeration system. Preferably, the refrigerant is R12. Heat exchange coil 22 functions as the system condenser in the loop which further includes a heat exchange coil 24 constituting the primary evaporator and a heat exchange coil 26 forming the system pull down evaporator. The vehicle is equipped with an engine exhaust duct or passage means 30 including sections as at 30a, 30b. Section 30b houses a vapor boiler 28. A cab conditioned air flow duct indicated generally at 32 permits both fresh air and return air to be introduced to the cab interior through conditioned air flow duct section 32c or duct section 32d. Air may be received from the fresh air inlet duct 32a of the duct 32, or cab return air from the cab air return duct 32b which also opens to the interior of cab 12.

The closed loop refrigeration circuit further comprises as basic elements, a cycle control valve 36, an oil separator 40, a pressure modulator 38, pull down valve 42, and an acceleration unloading valve 44. In addition, a plurality of heat pipes indicated generally at 31 thermally couple the exhaust duct 30 and the air conditioning duct section 32c for permitting selectively heating of the interior of cab 12 by heat recovery action from the exhaust gas passing through the exhaust duct 30.

In the schematic views of FIGS. 4a-4e, the compressor/expander unit 18 is illustrated schematically as having a capacity slide valve 46 and a volume ratio slide valve 48 or pressure matching slide valve 48', the capacity slide valve 46 being situated at the inlet 50, while the pressure matching or volume ratio slide valve is structurally mounted at outlet 52.

Further, the compressor is provided with an oil injection port 54 which opens to the compressor interior at a point intermediate of inlet 50 and outlet 52 in terms of the compression or expansion process, while the unit 18 is further provided with a vapor injection port 56 which opens to a compressor closed thread cut off from both the inlet 50 and the outlet 52 and permits refrigerant vapor at intermediate pressure to be returned efficiently to the compressor at a point of the compression or expansion process corresponding to that intermediate pressure.

The function and operation of the capacity control slide valve 46 and the pressure matching 48' or volume ratio slide valve 48 may be appreciated by reference to prior U.S. Pat. No. 3,936,239 as well as FIGS. 1-3, and 3a, which show unit 18 in greater detail.

Turning to FIG. 1, the compressor/expander unit 18 is constituted by a three part fixed housing or casing including a central or intermediate casing section 60, a front or driven end casing section 62 and a rear casing section 64, all of which may be formed of cast iron, although alternatively the sections may be formed of aluminum or the like. The central section 60 is of irregular configuration and is provided, FIG. 2, with a pair of parallel, longitudinally extending bores as at 66, 68 receiving respectively shafts 70 and 72, bore 66 being counterbored at 66a at one end and 66b at the other, while bore 68 is counterbored at one end 68a and at the other end at 68b. The shaft 70 bears the female helical screw rotor as at 74, while shaft 72 bears the male helical screw rotor 76 which is enmeshed therewith within a working chamber as defined by the intermeshed screws and the counterbores 66a and 68a of central or intermediate casing 60. The rotor profiles may be circular or assymetrical. In the illustrated embodiment, the male rotor has a diameter, for instance, on the order of 40.8 mm and the female 38.6 mm. The L/D ratio (based upon male rotor diameter) is 1.1. This type of compressor has very flat performance characteristics (COP, VE, adiabatic efficiency) between speeds of 3,000 to 10,000 rpm, and therefore a speed ratio of 0.1 to turbine speed is preferred. The rotors 76 and 74 are supported by bearings as at 75, 78 for shaft 72 and 80 and 82 for shaft 70. In this respect, section 62 of the casing is provided with a bore 84 which receives the bearing 75 and is further provided with an annular recess 86 within one end face 62a thereof, recess 86 receiving bearing 80. One end of shaft 70 is borne by the anti-friction bearing 80 in this case. Shaft 72, however, extends completely through the casing section 62. The casing section 64 receives a reduced diameter portion 72a of shaft 72 which extends into a bore 88 which extends partially from one end face 64a of casing section 64 and which is further counterbored as at 90 to bear stator 92 and rotor 94 of gear rotor type liquid pump 95. The rotor 94 is keyed to reduced diameter shaft portion 72a of shaft 72 by way of key 96. In that respect, the casing section 64 is provided with a projecting portion 64b in the vicinity of the bore 88 and counterbore 90 and is provided with a hole 98 constituting an outlet of the pump as defined by members 92, 94. A second hole as at 100 constitutes an inlet for that pump. The liquid pump, indicated generally at 95, is utilized by the system of FIGS. 4a–4e in the heat recovery mode and the pump constitutes a conventional gear rotor type. Casing sections 60, 62 and 64 are joined by pins as at 102 and appropriately the sections may comprise O-ring seals 63 between confronting contact surfaces. An input ring gear 104 which in the illustrated embodiment of the invention is of approximately 3½ inch OD, is mounted for rotation on a tubular member 106 by way of bearings 108 and maintained in position by a mounting ring 110 screwed thereto by way of screws 112. This gear 104 is splined at 114 to the flange portion 116a of sleeve 116 which, in turn, is splined to the shaft 72 as at 118. The tubular mount 106 bears the projecting portion 72b of the shaft 72 beyond bearing 76 and is provided with appropriate seals as at 120.

Rotation of the male rotor 76 is counterclockwise when viewed from the driven end, via gear 104, FIG. 1. However, the compressor/expander could run in the clockwise direction by providing it as a mirror image to that shown. The flange 62a for casing section 62 is provided bolt holes as at 122 to permit the compressor/expander unit to be flange mounted.

Representative casing dimensions of the compressor are 9⅛ inches × 5¾ inches × 5 3/16 inches. The central casing section 60 is provided with a refrigerant working fluid vapor injection port 124 and an oil injection port 126 which open respectively to bores 66a and 68a housing the female and male helical screw rotors 74, 76, respectively.

It is to be noted, particularly by contrasting FIGS. 2 and 3, that the vapor injection and oil injection ports as at 124, 126 open to the intermeshed screws at positions separate and sealed from the compressor/expander vapor inlet and outlet ports for the same unit. The vapor injection port 124 opens to the female rotor bore for pull down capability, that is, accelerated cooling, for instance when the vehicle engine is started after standing in the sun for an extended period of time. The oil injection port 126 is employed in returning oil to the male rotor bore 68a. This oil acts to maintain the compressor cool and to seal and lubricate the intermeshed male and female rotors 76, 74. The seal mechanism indicated generally at 128 for the male rotor shaft 72 is conventional where it exits the rotor housing as defined by casing section 62 beyond bearing 75. Further, the driving gear 104 is supported by its own bearing system including tubular member 106 and is connected through the splined hub to the male rotor shaft with no clutch mechanism being required due to the fact that the compressor/expander is either being driven or is driving the engine at all times.

Turning next to FIG. 3, this cross-sectional view is approximately 90° to that shown in FIG. 2. This illustrates completely both slide valves 46 and 48 as well as the inlet and outlet ports, 50a, 52a, and their connection points for the refrigeration loop. In that regard, the intermediate or central compressor casing section 60 is provided with a hole or opening 50 within a flange portion 60a which hole opens up to a cavity 130 and acts as the inlet to the compressor/expander working chamber as defined by bores 66a and 68a.

In FIG. 3, only the male helical screw rotor 76 is shown, the female helical screw rotor overlying the same as seen in FIG. 2 and being in mesh therewith. To the sides of the intermeshed male and female rotors lie slide valves, the capacity control slide valve 46 lying to the left when viewed from the driven end and the volume ratio slide valve 48 being to the right. The volume ratio slide valve 48 may be replaced by a pressure matching slide valve of the type shown in U.S. Pat. No. 3,936,239. The profile of the slide valves 48 and 46 which are formed of metal blocks machined to the desired configuration is such that surfaces 46a of slide valve 46 and 48a of slide valve 48 act as extensions for the envelope define working chambers as further formed by bores 66a and 68a for the helical screw rotors, as per the reference patent. The slide valves 46 and 48 are mounted in respective recesses 132 and 134 formed within the intermediate casing section 60 (and partially within casing section 62 for slide valve 48). Slide valve 46 bears piston rod 136, which has fixed thereto at one end, a piston 138 bearing a peripheral seal ring as at 140, piston 138 sliding within a cylindrical bore 142 defining a chamber 143 within casing section 64. Casing 64 is provided with a hydraulic fluid inlet port as at 144, permitting the piston and the slide valve 46 to be shifted to the extreme left, FIG. 3, against the bias of a coil spring 146. Spring 146 has ends respectively received within a circular recess 148 of the fixed casing section 62 and a similar circular recess 150 within the end face of the slide valve 46. The compression spring 146 is such that it normally forces the capacity slide valve 46, absent hydraulic liquid within chamber 144, to its full rightmost or full load position as indicated by dotted line 152a, the capacity slide valve 46 being shown in full lines in part load position. When operating as a compressor, compressor capacity reduction is accomplished via suction cut off, that is, the rotors are not allowed to completeley fill which effectively reduces the size of the compressor without losses that are associated with suction throttling. When operating as an expander, the capacity slide valve serves to regulate the inlet flow to the expander, based upon the vapor output of boiler 28, FIG. 4a. In that regard, the dot-dash line 152b represents the position of the capacity slide valve at full load position for expander operation. The volume ratio slide valve or $v_i$ slide valve 48 is slidably mounted within a recess 134 and bears a piston rod 154 which extends from one end thereof rearwardly. Rod 154 terminates at piston 156 whose periphery bears a sealing ring 158 which is sized to the diameter of cylindrical bore 158 defining a chamber 159 within casing section 64. Piston 156 and cylindrical bore 158 form a hydraulic motor 157 which receives a hydraulic fluid through a control or supply port 160 which opens to bore 158. The volume ratio slide valve 48 is, in this embodiment, a two position slide valve maintained at either of two extreme positions, depending upon whether the system is in air conditioning or heat recovery mode. Thus, when it is all the way to the left, it is in the "expander" position with a resulting volume ratio or $v_i$ of 1.0, while when the volume ratio slide valve 48 is in the position in FIG. 3, it is in the "compressor" position, where the volume ratio $v_i$ is 3.5. A portion of the recess 134 defines an outlet passage as at 162 terminating in outlet 52 which passes through the wall of the intermediate or central casing section 60. Thus, regardless of operating mode and whether the unit 18 is functioning as a compressor or an expander, R12 working fluid always enters the inlet port 50a, via inlet passage 130 to a closed thread. It exits via outlet passage 162 from outlet port 52a.

It may, therefore, be appreciated in the embodiment of FIG. 3, that the capacity slide valve 46 absent hydraulic fluid under pressure within chamber 143 is biased to its extreme full right position by expansion of the coil spring 146. The hydraulic fluid for shifting the slide valve 46 by acting on the face of the piston 138 may in fact be the refrigerant working fluid in liquid form, within the closed loop refrigeration system to which the compressor/expander unit has application. Additionally, the volume ratio slide valve 48 is provided without a biasing element such as a coil spring similar to that at 146, in this case absent an applied control pressure fluid such as oil or a working fluid at port 160 and acting on the right side of piston 156, the discharge pressure of the working fluid within outlet passage 162 will act on the left face of piston 156, forcing it to the right. The surface area of the piston 156 is larger than the surface area of face 48b of the volume ratio slide valve 48. Thus, under normal compressor operation, absent hydraulic control fluid or the like at 150, the slide valve 48 will be positioned all of the way to the right in its rightmost position as shown in FIG. 3, for a maximum volume ratio $v_i$ as at 3.5. When functioning as an expander, the volume ratio slide valve 48 is shifted to its maximum extent determined by the stroke of the piston 156 within cylindrical cavity 150 shifting the end face 48b to the dotted line position 48b', FIG. 3, and providing a volume ratio of 1.0. This allows the refrigerant working fluid or gas to fully expand. There is no recompression.

Figure 3A:
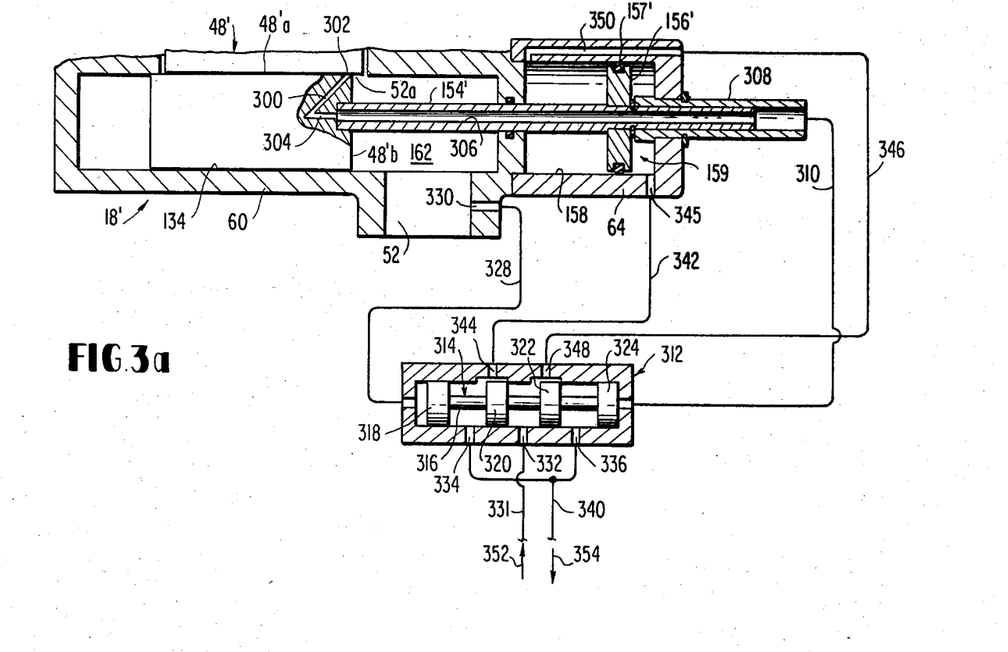
FIG. 3a is a horizontal sectional view of a portion of the modified compressor/expander unit of the present invention incorporating a pressure matching slide valve.

Referring next to FIG. 3a, this figure constitutes a modification of the compact, helical screw rotary compressor/expander unit similar to that of FIGS. 1–3 inclusive and employable in the system of FIGS. 4a–4e inclusive. Like elements to those found in the embodiment of FIGS. 1–3 inclusive bear like numerical designations. Only portions of casing sections 60 and 62 are shown, and only those relative to the male helical screw rotor 76 and in this case a pressure matching slide valve 48' replacing the volume ratio slide valve 48 of the prior described embodiment, fitting identically within the recess 134 formed within the casing sections 60 and 62. An outlet passage 162 is provided leading from the outlet port 52a. End face 48'b defines a portion of the outlet passage 162. A piston rod 154' extends from the slide valve 48' and terminates at piston 156' which bears an O-ring seal about its periphery as at 157', bearing on cylindrical cavity 158 defining a chamber 159, within which piston 156' reciprocates.

The pressure matching slide valve 48' is provided with an inclined small diameter hole or passage 300 opening to the exterior of the slide valve 48' at the surface 48'a defining the envelope apart from the intermeshed helical screw rotor just upstream from the end face 48'b of the slide valve 48' at the discharge side of the compressor/expander unit 18' and defining a closed thread pressure sensing port 302 which opens up to a closed thread and permits sampling of the pressure of the working fluid at the point in the compression or expansion cycle just prior to discharge at port 52a, through the outlet passage 162. The slide valve 48' is further axially bored at 304 intersecting the inclined passage 300 and being of a similar, small diameter. Further, the shaft 154' is provided with a corresponding small diameter bore 306 which extends to the piston 156' and beyond the shaft 154' terminating within a sleeve 308 having an internal diameter on the order of the external diameter of shaft 154' and forming a slidable, sealed connection therewith, permitting passage 306 to sealably communicate with sleeve 308 regardless of the axially shifted position of piston 156'. A line 310 is connected to sleeve 308 and provides a pressure signal to one end of pilot valve 312, the pilot valve 312 housing a pilot valve piston indicated generally at 314 and being comprised of a shaft 316 and four lands as at 318, 320, 322 and 324 sealably contacting at their peripheries the inside of the cylindrical pilot valve casing 326 which is closed off at its ends. The pressure matching slide valve, and its operation, is essentially the same as that shown in U.S. Pat. No. 3,936,239 and is briefly referred to herein. Further reference may be had to that patent to fully appreciate and understand the pressure matching function of slide valve 48'. However, briefly, in that respect, a second line 328 extends from a sensing port 330 within casing section 60 at the outlet 52 and fluid communicates the discharge port 52a to the interior of the pilot valve casing 326 on the left side of land 318 of the piston 314. A hydraulic fluid inlet line 331 opens to the interior of casing 326 at a central port 332 intermediate of lands 320 and 322. The cylinder is provided with a pair of outlet ports as at 334, 336 which connect to an outlet line 340. Further, hydraulic fluid is delivered selectively to chamber 159 to one side or the other of piston 156', depending upon whether the pressure matching slide valve 48' is to be driven to the left or the right. In that respect, a line 342 leads from port 344 within casing 326 to port 345 within casing section 62 opening to the chamber 159 on the right side of piston 156', while a line 346 leads from port 348 to a passage 350 within casing section 62 which opens to chamber 159 on the left side of piston 156'. It may be seen that while one side of the piston 156' is receiving hydraulic fluid under pressure, hydraulic fluid previously supplied to the opposite side is draining through the pilot valve back to the return line 340. The source and sump for the hydraulic fluid are not shown. However, schematically, arrows 352 and 354, respectively, represent these elements of the system. Therefore, automatically, depending upon the pressure sensed by the sensing port 302, of the closed thread at the moment just before discharge, when compared to the discharge pressure within outlet 52, the slide valve 48' is shifted either to the right or to the left by application and removal of hydraulic fluid under pressure from chamber 159 on respective sides of the piston 156' in accordance with the principles as set forth in U.S. Pat. No. 3,936,239. The controlled shifting of the slide valve 48' axially or longitudinally equalizes the pressures to prevent undercompression or overcompression of the working fluid when the unit is in the compression mode, or alternatively, to prevent overexpansion or underexpansion of the working fluid when the unit is functioning as an expander, prior to discharge.

Turning next to FIG. 4a, because of the explanation of the nature and operation of the compressor/expander unit 18, its capacity slide valve 46 and its volume ratio slide valve 48 (or alternatively its pressure matching slide valve 48') as well as the liquid pump 20, full appreciation of the improved automotive vehicle air conditioning system and waste heat recovery system, in terms of its componentry and the various modes of operation as evidenced by FIGS. 4a–4e inclusive can now be had. The outlet 52 of the unit is always connected to the system condenser 22 via oil separator 40 by way of conduit means or line 164 with the separated oil as at O returning to the compressor for injection at oil injection port 54 by way of an oil injection line 166. The working fluid R12, separated from the oil O within the oil separator 40, passes to condenser 22 via line 168, where the refrigerant working fluid is condensed within the condenser 22 and passes to cycle control valve 36 via line 170. The cycle control valve 36 provides for the various modes of operation, depending upon temperature parameters in a manner consistent with conventional refrigeration circuit control. It can be manual or automatic. In that regard, line 172 extends from the cycle control valve 36 to the main evaporator 24 for the system and bears a thermal expansion valve 174 to permit the condensed refrigerant to expand, within line 172 downstream of the expansion valve and to absorb heat by passage through the evaporator 24. Line 176 permits the vaporized refrigerant to return to the cycle control valve 36 after picking up thermal energy within the evaporator 24. Line 178 leads from the cycle control valve 36 to the inlet 50 to the compressor/expander unit 18 under control of the capacity slide valve 46.

When the vehicle is left standing in the sun and requires accelerated cooling, this is achieved by use of the pull down evaporator 26. In that respect, a line 180 branches from line 174 at point 182 and directs liquid refrigerant to the pull down evaporator coil 26, line 180 including pull down valve 42 constituting a solenoid operated control valve which, when de-energized, blocks flow to the pull down evaporator, but when energized, permits liquid refrigerant to flow to a thermal expansion valve 183 within line 180 downstream of the pull down valve 42, where the refrigerant R12 vaporizes and passes through the pull down evaporator or coil 26 to additionally cool the air passing through duct 32 to the cab 12 in addition to that cooled by the system main evaporator 24.

A further branch line 184 extends from line 180 at point 186 to the capacity slide valve control inlet port 144, line 184 including an acceleration unloading valve 44 which, like valve 42, constitutes a solenoid operated control valve which, when energized, permits flow through line 184 for the liquid refrigerant from the cycle control valve to the slide valve control inlet port 144 at full compressor discharge pressure, forcing spring 146 to be fully compressed and shifting slide valve 46 to full unload position. A bypass line 186 extends about the acceleration unloading valve 44 and bears a pressure modulator 38 which can modulate the pressure of the liquid refrigerant within the bypass line 186 and passing to the slide valve control inlet 144 as control pressure liquid when the acceleration unloading valve 44 is de-energized and closed. A line 190 extends from the pressure modulator 38 to line 176 downstream of the evaporator. Thus, the pressure of the liquid refrigerant available to the slide valve control inlet port 144 as a control signal is dependent upon the pressure within the line 176 returning to the suction side of the compressor from the evaporator coil 24, and thus compressor or expander capacity is modulated by evaporator coil 24 vapor return pressure, absent energization of acceleration unloading valve 44.

Further, the pull down evaporator coil 26 does not return to the suction or inlet port 50 for the compressor/expander unit 18, but rather returns to a vapor injection port 56 via vapor injection line 192 at a closed thread position which is intermediate of the suction and discharge pressures for the compressor. The cycle control valve 36 further includes line 194 which extends from that valve to inlet 100 of liquid pump 70 and line 196 which connects the outlet 98 of that pump to vapor boiler 28, permitting liquid refrigerant to pass to the vapor boiler 28 for vaporization as a result of heat exchange with the exhaust gases from the vehicle internal combustion engine. The vaporized refrigerant returns to the cycle control valve via line 198.

Indirect heat transfer is effected from the exhaust gas to the air to be conditioned flowing to cab 12 within duct 32. The plurality of heat pipes 34 have opposed ends in heat transfer position with respect to the exhaust duct 30 and section 32c of the conditioned air flow duct 32. A cab air return duct 32b connects to the cab interior at 200 and merges with fresh air duct portion or section 32a at point 202, the cab air return duct 32b preferably including a blower as indicated schematically by fan blade 204 for forcing air circulation through the duct 32 to and from the cab interior 12 as well as permitting fresh air to enter through fresh air inlet opening 206 within the fresh air duct 32a, the cab 12 may be conditioned purely by way of recirculation of cab air or by way of fresh air selectively, this being achieved by the utilization of a pivotable fresh air damper 208 mounted within duct section 32a and closing off the opening 206 when in vertical position, but pivotable about the axis of pivot pin 210 mounted to the duct and supporting the damper 208 to a horizontal position or an inclined intermediate position to selectively vary the amount of fresh air entering the cab interior 12. A motor 209 is provided to rotate damper 208.

Downstream of the pull down evaporator coil 26 and the main evaporator coil 24, duct 32 splits into the two sections 32c and 32d as mentioned previously. At the upstream end of duct section 32c, there is provided a heat pipe bypass damper at 212 which pivots about a pivot pin 214, driven by motor 211, between the vertical position shown in FIG. 4a which closes off duct section 32c to air flow downstream of the two coils 26 and 24. In this case, the air bypasses the duct section 32c, passing through duct section 32d and entering the cab interior through an opening 216.

In contrast, when the damper 212 is in a horizontal position, it closes off the upstream end of duct section 32d and forces the air flow to pass through duct section 32c and enter the cab interior through opening 218. Mounted within the duct section 32c are ends 34a of the heat pipes 34 which may be enlarged in diameter and finned to insure excellent heat exchange between the air flowing across ends 34a of these elements. The opposite ends 34b of the heat pipes 34 are disposed within the exhaust duct section 30a, that section being separated by means of a longitudinally extending wall 220 so as to define a lower heat pipe bypass flow path or passage as at 222 and an upper flow path or passage as at 224. The flow paths are controlled by a heater bypass damper 226 being pivoted at one end for rotation about the axis of pivot pin 228 mounted to the duct 30, the damper 226 being driven by a motor 227 and pivoting 180° so as to close off selectively either passage 222 or 224. The lower ends 34b of the heat pipes 34 are disposed within passage 224 so that when the exhaust gas passes through the passage 224 on the upper side of the wall 220, the heat of the exhaust gas is transferred by way of the heat pipes 34 to ends 340a within duct section 32c. The duct section 30b is enlarged downstream from the heat pipes 34 and provided with a longitudinally extending generally horizontal separating wall 230 defining an upper vapor boiler bypass flow path or passage 232 at this point and a lower flow path or passage 234 prior to discharge at the discharge opening 236 for the exhaust duct 30. The vapor boiler 28 is disposed within the flow path 234 and the wall 230 is extended at its upstream end transversely to the direction of flow of the exhaust gases, and includes an upstream opening 238 which may be selectively cut off by a further vapor boiler bypass damper 240, which is pivoted at one end by way of pivot pin 242 and driven by motor 241, so that when it is disposed horizontally and spans opening 238, it forces the exhaust gas to flow into the upper flow path 232 bypassing the vapor boiler, while when it is deflected to a horizontal position at 90° thereto, this damper closes off the upper vapor boiler bypass flow path 232 and forces the exhaust gas to pass through the lower flow path 234 and effectively heat and vaporize the refrigerant within the vapor boiler 28 causing an increase in its enthalpy.

The cycle control valve 36 is preferably temperature controlled by thermosensors (not shown). Further, cycle control valve 36 controls the feed of liquid refrigerant at compressor discharge pressure through line 195 to control port 160 for chamber 159 to force slide valve 48 to minimum volume ratio position. In addition, several of the dampers are automatically shifted between extreme positions depending upon the temperature of the air flow passing through portions of the ducts 30 and 32. Each damper is equipped with a thermal responsive drive motor. In that respect, the damper 212 is controlled directly by a thermal sensor as at 244 mounted within duct section 32c downstream of the heat pipes 34 and controlling the position of damper 212 upstream thereof by effecting a shift between vertical and horizontal positions for damper 212 via control line 246 to motor 211. Also, the damper 240 is shifted between vertical and horizontal positions depending upon the temperature of the vaporized refrigerant passing through the vapor boiler 28 as determined by thermosensor 248 within that line and downstream of the vapor boiler, the thermosensor 248 being connected to a drive motor 241 associated with the damper 240 for pivoting the damper 240 about the axis of its pivot pin 242 by line 250.

FIG. 4a shows the dual air conditioning and waste heat recovery system under an air conditioning mode for the cab interior 12. In this case, the exhaust duct damper 226 is in the vertically up position, forcing air flow through heat pipe bypass passage or path 222 within section 30a of the exhaust duct 30, while the damper 240 is maintained in its vertical position closing off air flow to passage 234 housing the vapor boiler 28. The exhaust gas simply passes to the discharge opening 236 of the manifold without any effective thermal exchange with heat pipes 34 or vapor boiler 28. The compressor/expander unit 18 is functioning to compress the refrigerant which is returned from the main evaporator coil 24 by means of the cycle control valve 36 via lines 176 and 178 to the unit inlet 50 under control of the capacity slide valve 46. Capacity of the compressor is determined by the pressure within the return vapor line 176 by way of modulation control line 190 which opens to the pressure modulator 38. The acceleration unloading valve 44 is de-energized. Thus, the compressor/expander unit in compressor mode has its capacity matching the load as defined by the heat pick up by the evaporator coil 24.

The pull down valve 42 is de-energized. The compressor is operating and the cycle control valve operates to direct compressed refrigerant vapor, after oil separation, to the condenser 22, where the liquid refrigerant passes to the evaporator coil via line 172 under control of the thermal expansion valve 174. There is no liquid refrigerant to the liquid pump 20 and no refrigerant available to the vapor boiler. The fresh air damper 208 is closed, and the fan 204 is energized to force the cab air to circulate from the cab outlet opening 200 through the cab air return duct section 32b, the main portion of conditioned air flow duct 32 housing the main evaporator coil 24 and returning air to the cab interior by way of duct section 32d with the heat pipe damper 212 in the vertical position closing off the upstream end of duct section 32c housing the heat pipes 34.

Figure 4B:
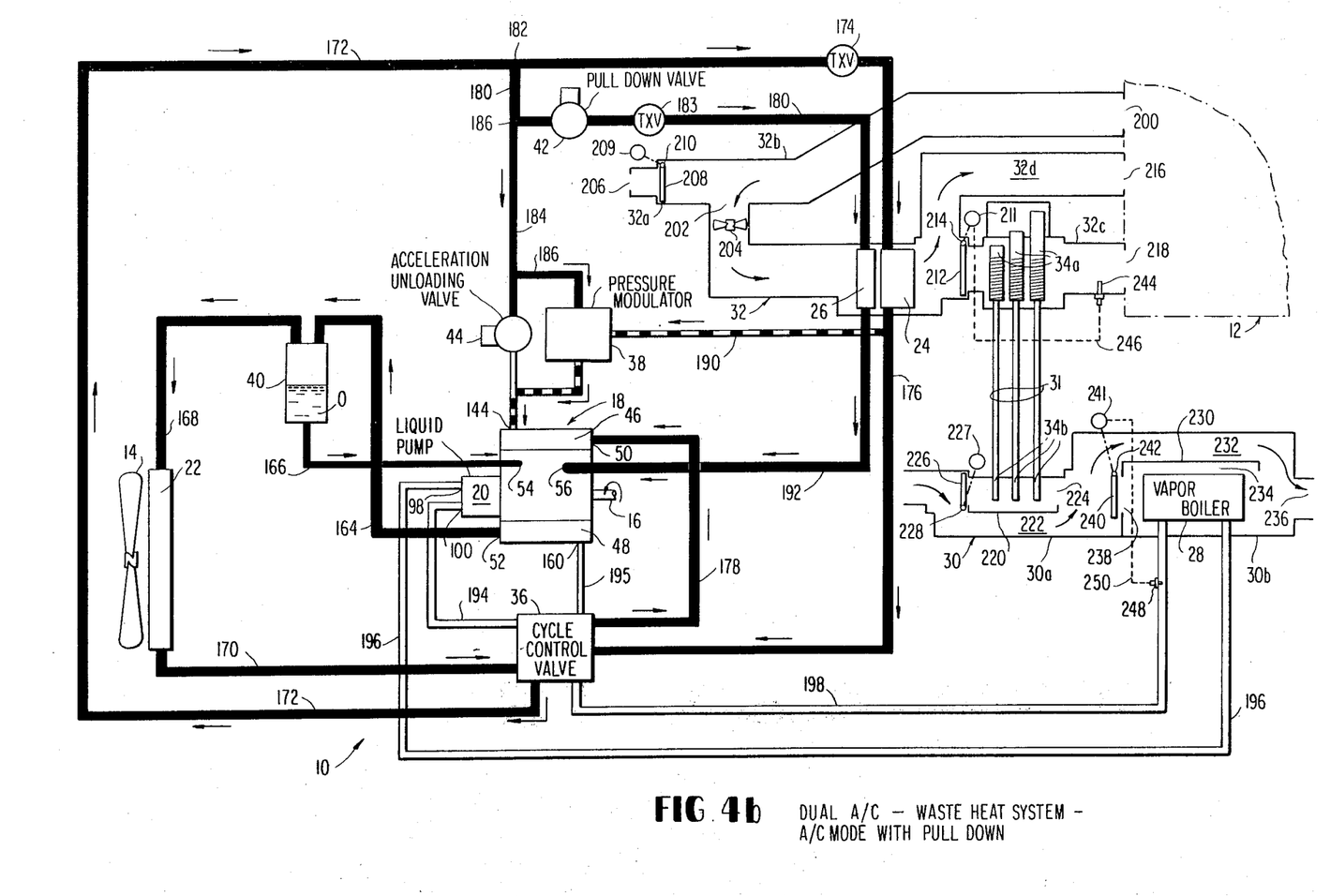
FIG. 4b is a schematic diagram of the system corresponding to that of FIG. 4a with the system operating under air conditioning mode with pull down.

Turning next to FIG. 4b, the system is shown in an air conditioning mode with the pull down evaporator coil provided with refrigerant for additionally picking up heat within the air being recirculated through the duct 32 to and from the cab interior 12. The cycle control valve remains the same as in FIG. 4a. However, the pull down valve 42 is energized such that a portion of the liquid refrigerant passes through line 180 to the pull down evaporator coil 26. The thermal expansion valve 182 causes the liquid refrigerant to expand. The refrigerant vapor within the pull down evaporator 26 expands to a pressure intermediate of the pressure of the refrigerant vapor at inlet 50, and discharge at outlet 52, returning to the compressor by way of the vapor injection port 56 via line 192. Again, the acceleration unloading valve 44 is closed, and the capacity slide valve is positioned in accordance with load conditions as sensed by the refrigerant vapor discharging from the evaporator 24 through the pressure modulator modulation control line 190 which controls the pressure of the liquid refrigerant as the piston power fluid entering chamber 143 to the right of piston 138 by way of slide valve control fluid inlet port 144. Further, both in the operation of FIGS. 4a and 4b, the system is functioning to provide cooling for the cab interior 12. As such, the volume ratio slide valve 48 is maintained at its rightmost position, FIG. 3, without application of any pressure fluid on the right side of piston 156. The end wall 48b on the right of the volume ratio slide valve 48 is subjected to compressor discharge pressure as well as the larger surface area as provided by the left side of piston 156 such that the slide valve is maintained in the rightmost "compressor" position. The built in compression ratio or $v_i$ of 3.5 is therefore provided when operating in the compressor (refrigeration cooling) mode.

Figure 4C:
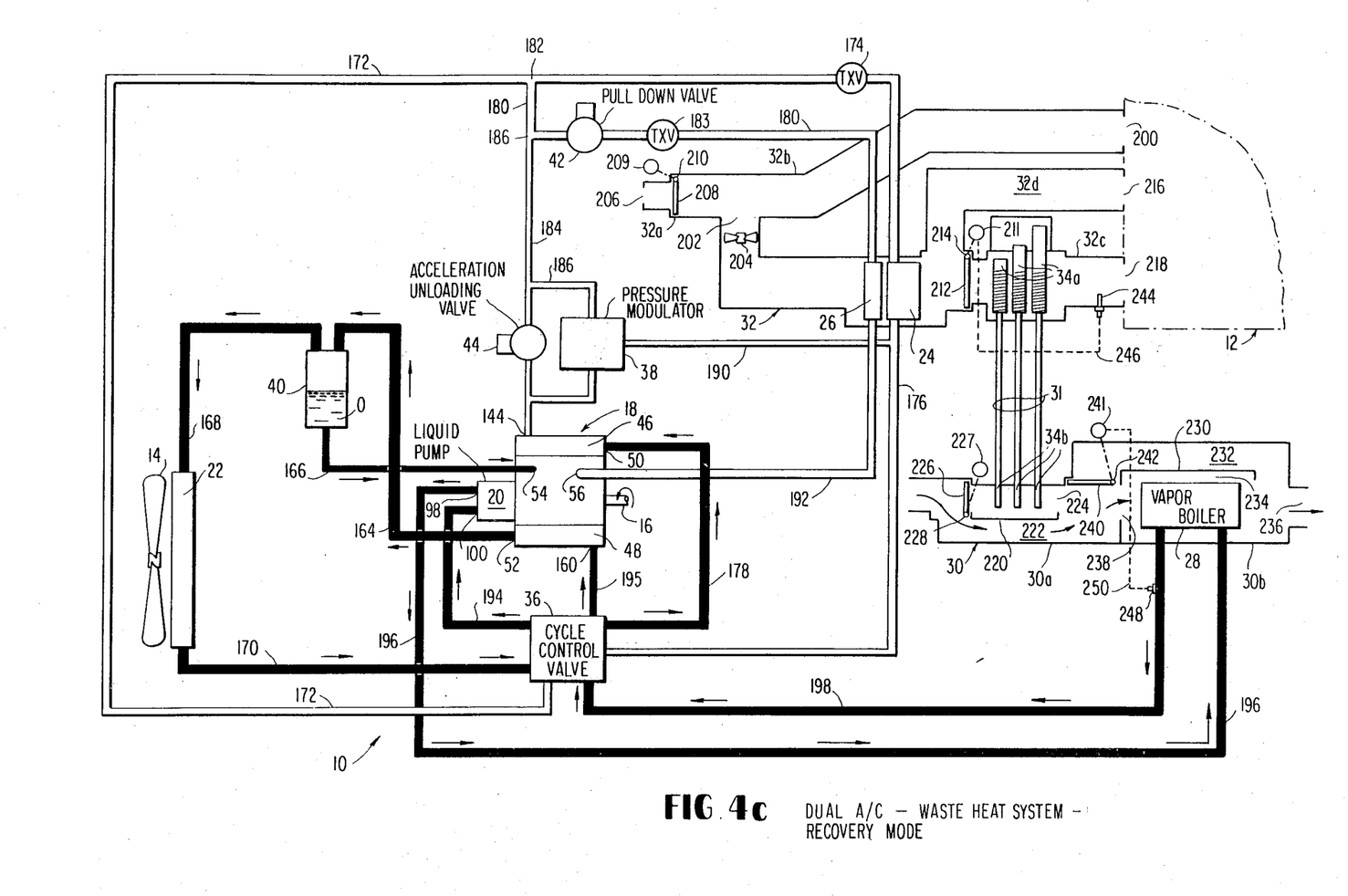
FIG. 4c is a schematic diagram corresponding to that of FIG. 4a, with the system operating under heat recovery mode.

Turning to FIG. 4c, the system is illustrated in a heat recovery mode where there is no necessity to provide either cooling or heating to the air within the cab or vehicle interior 12. In that respect, the compressor/expander unit 18 is now functioning as an expander. The energy for the system comes from the exhaust gas which is prevented from providing effective heat exchange with the heat pipes 34, since the heater bypass damper 226 is maintained in its vertical, upright position relative to the axis of its pivot pin 228, the exhaust gas passing through bypass passage 222 of section 30a of the exhaust manifold. The vapor boiler 28 provides the necessary heat exchange for the refrigerant working fluid which is forced under pressure to the vapor boiler through line 196 from the outlet 98 of the liquid pump. The relatively high pressure, now vaporized refrigerant exits from the vapor boiler through line 194 and passes by way of cycle control valve 36 to the inlet 50 of unit 18 functioning as an expander, with the capacity slide valve 46 controlling the rate of vapor flow to the intermeshed helical screw rotors, driving the gear 104 (rather than being driven by the engine) and imparting to the engine useful mechanical energy to assist in providing driving torque to the wheels of the vehicle. The expanded vapor discharges by way of outlet port 52a under control of the volume ratio slide valve 48 and passes by way of lines 164 and 168 to the condenser 22, where the refrigerant is liquified. It returns to the inlet port 100 of the liquid pump by way of the cycle control valve 36 through lines 170 and 194. The vapor boiler bypass damper 240 is rotated to horizontal position and insures closure of the bypass passage 232 for vapor boiler 28. Heater bypass damper 226 is rotated to the vertically upright position to insure bypass of the exhaust gas relative to the heat pipes 34. The fresh air damper 208 and the heat pipe air conditioning duct bypass damper 212 are closed and pivoted to vertical position, insuring air flow through the bypass duct section 32d.

Additionally, since the system is under a recovery mode where the helical screw rotary compressor/expander unit 18 functioning as an expander, driving the liquid pump 20 and additionally providing a mechanical output to the vehicle drive system of some magnitude, it is necessary that the volume ratio slide valve be shifted to the "expander" position, which is the full left position, FIG. 3, by the application of full discharge pressure to the right side of piston 156 forcing the volume ratio slide valve 48 to move to full left within recess 134, as determined by the length of the cylindrical cavity 158 within casing section 64. In this case, the expander has a resulting volume ratio of 1.0. Control cycle valve 36 delivers liquid refrigerant via line 195 to control inlet port 160.

Figure 4D:
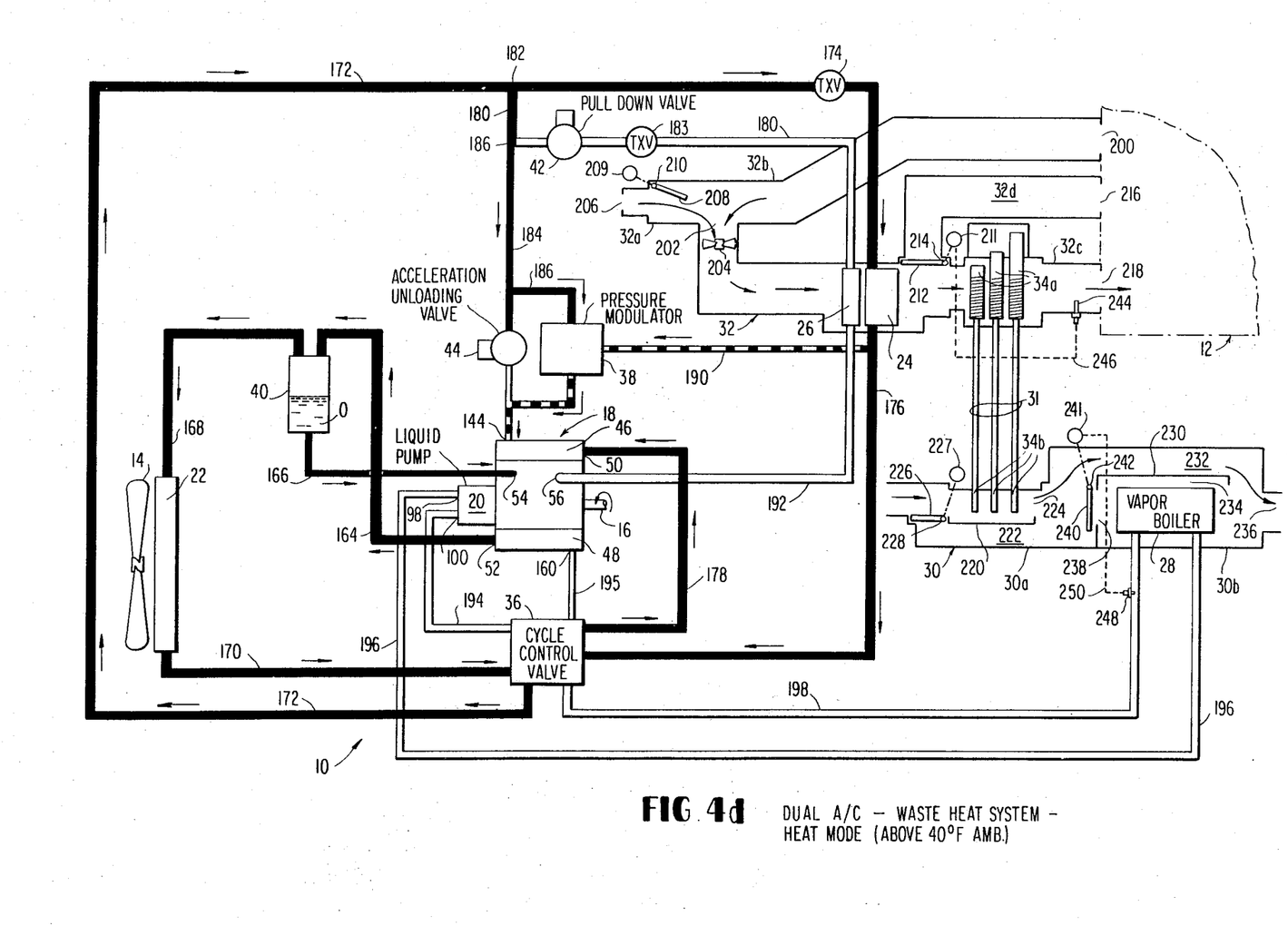
FIG. 4d is the schematic diagram corresponding to that of FIG. 4a, with the system operating under heating mode (above 40° F. ambient).

Turning next to FIG. 4d, the automotive vehicle air conditioning and waste heat recovery system is shown in operation under a heating mode which is arbitrarily set above 40° F. ambient in terms of operation of the cycle control valve 36.

Under these circumstances, the heater bypass damper 226 is shifted by the heater bypass control motor 227 from a vertical upright position to a horizontal position closing off the upstream end of passage 222 of the heater bypass passage 222 and forcing the exhaust gas to pass over the lower ends 34b of heat pipes 34 to cause vaporization of the confined working fluid within the individual heat pipes and migration by gas to the opposite ends 34a located within the conditioned air flow duct section 32c. The resulting temperature within the duct section 32c downstream of the heat pipe results in the thermal sensor 244 actuating automatically the heater bypass damper drive motor 211 to cause the damper 212 to move from a vertical position to a horizontal position, opening the upper end of the duct section 32c and closing off the bypass duct section 32d. The vapor boiler bypass damper 240 is closed by operation of the drive motor 241 under control of thermostat 248 which senses the drop in temperature of the vapor in line 198 since the cycle control valve 36 no longer effects the circulation of working fluid in liquid form through the liquid pump 20 and line 196 to the vapor boiler 28. Closing off the passage 234 results in a flow of the exhaust gas through the vapor boiler bypass passage 232 for discharge from the exhaust manifold or duct 30 at the discharge opening 236. The refrigeration loop as evidenced by evaporator 24 and condenser 22 functions to provide limited cooling at the evaporator 24 to reduce the humidity of the air passing over the ends 34a of the heat pipes prior to entering the cab interior as at 12. The fresh air damper 208 is driven by motor 209 to an open or partially open position to merge some fresh air with the cab recirculation air by way of cab air return duct 32b, the air mixture passing through the duct 32 and contacting the coil of evaporator 24. The compressor/expander unit 18 is functioning as a compressor. The position of the capacity control slide valve 46 is dictated by the vapor pressure of the refrigerant leaving the evaporator 24 as provided by the control through the line 190 to the pressure modulator 38 which modulates the pressure of the liquid refrigerant available to the slide valve chamber 143 behind piston 138 and acting to shift slide valve 46 to the left against the bias of the compression coil spring 146. The pull down valve 42 is de-energized, the pull down evaporator 26 is not employed, and the refrigerant vapor passing from the evaporator coil 24 through line 176 returns to the inlet port 50 for the compressor/expander unit 18 via line 178. The refrigerant vapor is discharged through outlet 52 and passes via lines 164 and 168 to the condenser with oil separation occurring at oil separator 40. The condensed refrigerant passes by way of line 170 back to the control cycle valve 36, where it is directed by line 172 back to the evaporator with expansion of the refrigerant occurring at the thermal expansion valve 174 upstream of the evaporator 24. Oil injection occurs.

However, there is no vapor injection as the pull down evaporator coil is not functioning.

Figure 4E:
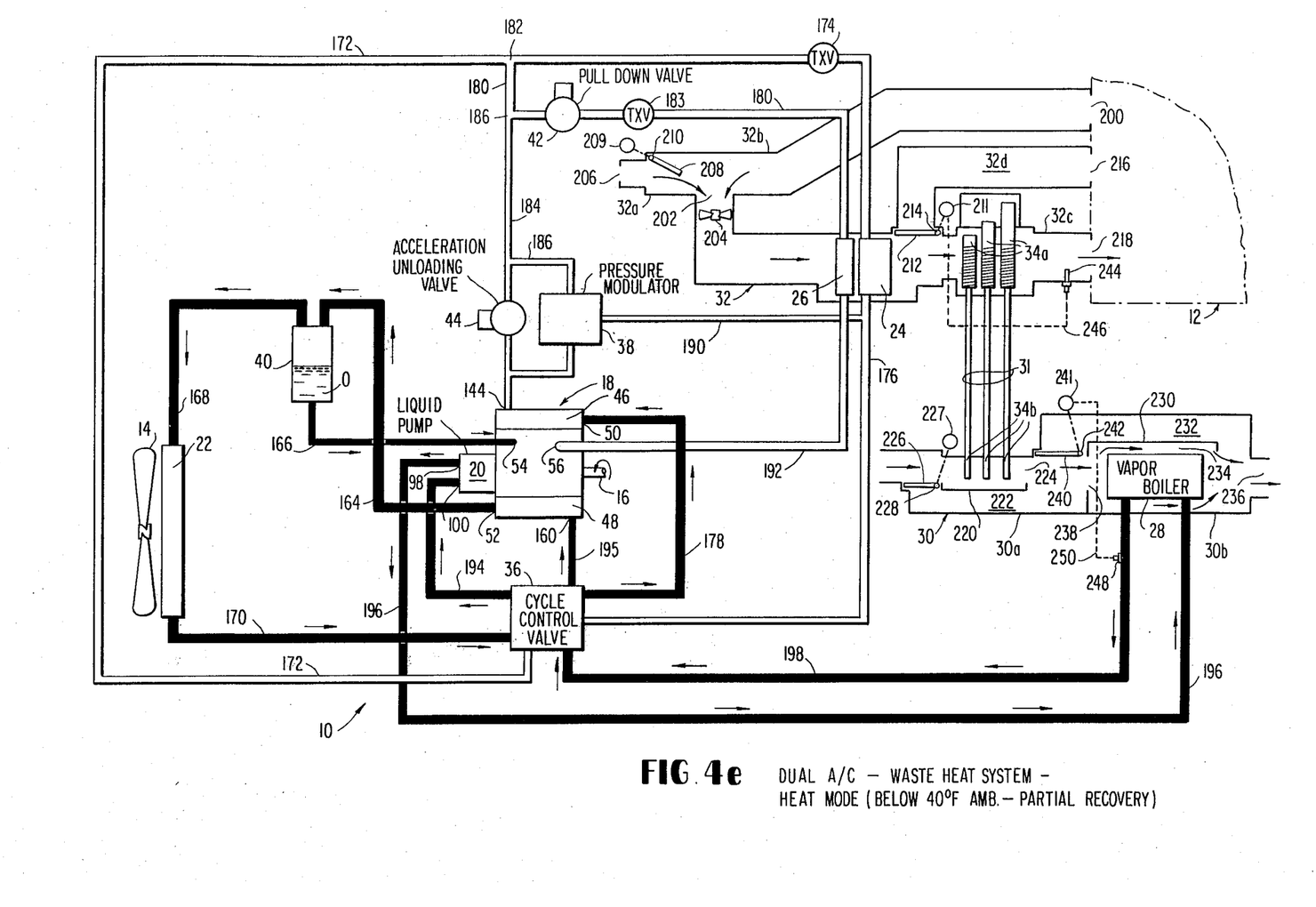
FIG. 4e is the schematic diagram corresponding to that of FIG. 4a with the system operating under heating mode (below 40° F. ambient-partial recovery).

Turning next to FIG. 4e, the system is shown in a heating mode. However, the ambient temperature is below 40° F. There is no requirement for humidity control and the system operates under partial recovery, that is, the heat which is not extracted by the heat pipes 34 from the exhaust gas passing through the exhaust duct 30 is employed by the vapor boiler 28 to vaporize refrigerant working fluid which passes to the compressor/expander unit 18, where it is expanded, providing useful work, not only for driving the liquid pump 20 but also tending to return mechanical energy to the vehicle engine drive shaft through gear 104. Since the unit 18 is acting as an expander, the volume ratio slide valve 48 is shifted by liquid refrigerant under pressure, via cycle control valve 36 and line 195 to the slide valve control port 160 driving piston 156 to the left and changing the unit volume ratio from 3.5 to 1.0 which maximizes the expansion of the refrigerant available to the inlet 50 under proper positioning of the capacity control valve without recompression prior to expansion. The unit improves compressor/expander efficiency by the incorporation of the slide valves 46 and 48 and the control of the same.

The vaporized refrigerant working fluid which returns to the unit 18 functioning as an expander by way of line 198 under control of the cycle control valve 36 expands within the unit 18, discharges at outlet 52 and passes through the oil separator 40 to the condenser 22 via lines 164 and 168. The liquid refrigerant returns to the cycle control valve 36 through line 170 and is pumped by operation of the liquid pump 20 through lines 194 and 196 back to the vapor boiler for revaporization, providing effective motive force derived from the waste heat normally discharged through the outlet 236 of the exhaust duct or pipe 30.

With respect to FIGS. 4a-4e inclusive, the $v_i$ slide valve 48 may be replaced as in FIG. 3a, by the pressure matching slide valve 48'. Port 302 which opens to a closed thread just upstream of the discharge, as defined by the end face 48'b of the slide valve 48', feeds to pressure comparator or pilot valve 312, the comparator 312 providing a drive signal to chamber 159 to vary the axial position of piston 156' and thus slide valve 48' to match closed thread pressure at discharge to condenser 22 pressure.

From the above description, it is evident that inlet port 50a functions to supply working fluid in vapor form to the unit 18, whether it functions as an expander or a compressor. Therefore, the helical screw rotors 74 and 76 always turn in the same direction and the rotors being gear coupled to the prime mover, whether a gasoline or diesel internal combustion engine, as in the instant environment, or an electric motor or gas turbine engine when more broadly applied to a prime mover system in which it is desirable to drive the unit as a compressor from the prime mover or to supply power input to the mechanical drive system by waste heat recovery when the unit is being utilized as an expander. When operating as a compressor, absent hydraulic fluid under pressure at control port 144 and chamber 143 on the right side of piston 138, the capacity slide valve 46 may move all the way to the right, as evidenced by dash-dot line 152a to expose the complete inner lobe volume to suction, the capacity slide being under full load position for the compressor operation.

To fully unload the unit acting as a compressor, energization of the acceleration unloading valve 44 occurs so that liquid refrigerant at full discharge pressure is directed to control port 144, shifting the slide valve to the position shown in FIG. 3, fully compressing coil spring 146 to its leftmost position as defined by piston contact with the right hand edge of casing section 60, FIG. 3, within cylindrical cavity 142.

Conversely, when operating as an expander, the capacity slide valve 46 is shifted to the position indicated with end face 152 at dash-dot line 152b. This is the position which is full load position when the unit is functioning as an expander. Simultaneously, the volume ratio slide valve 48 is shifted to its full left position, providing a minimum volume ratio in order to gain maximum expansion of the vapor from the boiler prior to discharge through outlet 52. If the volume ratio slide valve 48 is maintained in the position shown in FIG. 3, when the unit 18 functions as an expander, there will be developed a very high inner lobe pressure. The vapor cannot totally expand, and as such, by shifting the $v_i$ slide valve 48 to its extreme left position, FIG. 3, this vapor is allowed to fully expand without any recompression. Thus, the unit operates as a unidirectional flow device, regardless of whether it is functioning as an expander or compressor.

Further, the rotor profiles may be either circular or assymetrical. It should be appreciated that in small assymetrical compressor/expander units, there are distinct seal problems and leakage problems at the intermesh between the rotors, and while units with assymetrical profiles have small leakage problems when operating as a compressor, such leakage is a major problem when the unit operates as an expander. To the contrary, with a circular profile, the leakage problem when operating as a compressor is moderate and when operating as an expander is minimized.

While the invention has been particularly shown and described with reference to a preferred embodiment thereof, it will be understood by those skilled in the art that various changes in form and details may be made therein without departing from the spirit and scope of the invention.

What is claimed is:

1. An improved air conditioning and waste heat energy recovery system for an automotive vehicle, said vehicle including an occupant cab to be air conditioned, an engine driven drive shaft, an engine exhaust gas passage, and a cab conditioned air flow passage leading to said cab, the improvement comprising:
   a helical screw compressor/expander unit, said unit including intermeshed helical screw rotors, one of said rotors being connected to the drive shaft to be driven thereby during compressor operation and for driving said drive shaft during expander operation,
   inlet and outlet ports for said compressor/expander unit,
   a capacity control slide valve for said compressor/expander unit operatively controlling inlet flow to said intermeshed helical screw rotors through said inlet port,
   a volume ratio control slide valve for said compressor/expander unit operatively controlling working fluid discharge flow from said unit at said outlet port,
   a condenser coil, an evaporator coil mounted within said conditioned air flow passage, a vapor boiler within said exhaust gas passage, conduit means carrying a refrigerant working fluid for fluid connecting said vapor boiler, said compressor/expander unit at said inlet and outlet ports and said evaporator in a closed loop combined refrigeration and vapor power circuit and including a cycle control valve for selectively controlling refrigerant flow to and from said unit, said vapor boiler and said condenser to permit said unit to act selectively as an expander and to and from said unit, said condenser and said evaporator when said unit functions as a compressor, for cooling conditioned air flowing within said conditioned air flow passage leading to said cab, passive heat exchange means between said conditioned air flow and said exhaust gas passages, first bypass means within said exhaust gas passage for selectively bypassing exhaust gas about said vapor boiler and said passive heat exchange means, such that selectively said exhaust gas may vaporize working fluid within said vapor boiler and for driving said helical screw compressor/expanded unit as an expander to positively rotate said drive shaft to thereby recover thermal energy from the exhaust gas, and second bypass means within said conditioned air flow passage leading to said cab for selectively causing the air entering said cab when said cab requires air conditioning to bypass said passive heat exchange means or for causing waste heat of the exhaust gas to heat the air entering the cab absent operation of said evaporator coil when said cab requires heat.

2. The system as claimed in claim 1, wherein said passive heat exchange means comprises heat pipe means having opposite ends projecting into said exhaust gas passage and said conditioned air flow passage, respectively.

3. The system as claimed in claim 2, wherein said conditioned air flow passage comprises a fresh air inlet opening externally of the vehicle and a cab air return duct open to the cab interior, and wherein said system further comprises means for merging of said fresh air inlet duct and said cab air inlet duct upstream of said evaporator coil, and a fresh air damper mounted within said fresh air inlet duct and overlying the open end of said fresh air inlet duct and selectively movable to meter the volume of fresh air introduced to the cab air recirculating to and from said cab through said conditioned air flow passage.

4. The system as claimed in claim 1, further comprising a pull down evaporator coil positioned within said conditioned air flow passage upstream of said evaporator coil and a refrigerant injection line connecting said pull down evaporator to said compressor/expander unit and terminating at a refrigerant vapor injection port opening to said intermeshed helical screw rotors at a point within the compression process cut off from said inlet and outlet ports, whereby refrigerant vapor may be returned to said unit when functioning as a compressor from said pull down evaporator at a pressure higher than that at said inlet port to improve compressor and system efficiency, and wherein said conduit means further comprise a branch line leading from said cycle control valve to said pull down evaporator coil and including a pull down control valve for selectively causing condensed, liquid refrigerant from said condenser coil to flow to said pull down evaporator for vaporization therein, such that said evaporator coil and said pull down evaporator function to quickly reduce the temperature of the conditioned air flowing through said conditioned air flow passage to said cab.

5. The system as claimed in claim 2, further comprising a pull down evaporator coil positioned within said conditioned air flow passage upstream of said evaporator coil and a refrigerant injection line connecting said pull down evaporator to said compressor/expander unit and terminating at a refrigerant vapor injection port opening to said intermeshed helical screw rotors at a point within the compression process cut off from said inlet and outlet ports, whereby refrigerant vapor may be returned to said unit when functioning as a compressor from said pull down evaporator at a pressure higher than that at said inlet port to improve compressor and system efficiency, and wherein said conduit means further comprise a branch line leading from said cycle control valve to said pull down evaporator coil and including a pull down control valve for selectively causing condensed, liquid refrigerant from said condenser coil to flow to said pull down evaporator for vaporization therein, such that said evaporator coil and said pull down evaporator function to quickly reduce the temperature of the conditioned air flowing through said conditioned air flow passage to said cab.

6. The system as claimed in claim 3, further comprising a pull down evaporator coil positioned within said conditioned air flow passage upstream of said evaporator coil and a refrigerant injection line connecting said pull down evaporator to said compressor/expander unit and terminating at a refrigerant vapor injection port opening to said intermeshed helical screw rotors at a point within the compression process cut off from said inlet and outlet ports, whereby refrigerant vapor may be returned to said unit when functioning as a compressor from said pull down evaporator at a pressure higher than that at said inlet port to improve compressor and system efficiency, and wherein said conduit means further comprise a branch line leading from said cycle control valve to said pull down evaporator coil and including a pull down control valve for selectively causing condensed, liquid refrigerant from said condenser coil to flow to said pull down evaporator for vaporization therein, such that said evaporator coil and said pull down evaporator function to quickly reduce the temperature of the conditioned air flowing through said conditioned air flow passage to said cab.

7. The system as claimed in claim 1, wherein a first linear motor is carried by said unit for shifting said capacity control slide valve, said motor comprising a piston slidable within a cylinder and coupled to said capacity control slide valve, a capacity control slide valve control port opening into said cylinder on one side of said piston, means for connecting said control port to condensed liquid refrigerant at discharge pressure for forcing said capacity control slide valve to shift towards unit unload position, a pressure modulator upstream of said control port for modulating the pressure of the liquid refrigerant entering the control port in response to load conditions of said closed loop refrigerant circuit, and means for biasing said slide valve toward full load position in opposition to said refrigerant at said control port.

8. The system as claimed in claim 4, wherein a first linear motor is carried by said unit for shifing said capacity control slide valve, said motor comprising a piston slidable within a cylinder and coupled to said capacity control slide valve, a capacity control slide valve control port opening into said cylinder on one side of said piston, means for connecting said control port to condensed liquid refrigerant at discharge pressure for forcing said capacity control slide valve to shift towards unit unload position, a pressure modulator upstream of said control port for modulating the pressure of the liquid refrigerant entering the control port in response to load conditions of said closed loop refrigerant circuit, and means for biasing said slide valve toward full load position in opposition to said refrigerant at said control port.

9. The system as claimed in claim 7, wherein said conduit means includes a modulation line connecting said pressure module to the return side of said evaporator coil such that the discharge pressure of the liquid refrigerant from said pressure modulator to said control port for said capacity control slide valve linear motor is varied in response to the refrigerant load of the evaporator coil when said unit functions as a compressor under refrigeration mode.

10. The system as claimed in claim 8, wherein said conduit means includes a modulation line connecting said pressure module to the return side of said evaporator coil such that the discharge pressure of the liquid refrigerant from said pressure modulator to said control port for said capacity control slide valve linear motor is varied in response to the refrigerant load of the evaporator coil when said unit functions as a compressor under refrigeration mode.

11. The system as claimed in claim 7, wherein said capacity control slide valve is spring biased towards full load position and said conduit means further comprises an acceleration unloading valve bypassing said pressure modulator and causing when energized, condensed liquid refrigerant at full compressor discharge pressure to be delivered to said capacity control slide valve hydraulic motor control port for application to said piston and for shifting said slide valve against said spring bias to full unload position.

12. The system as claimed in claim 8, wherein said capacity control slide valve is spring biased towards full load position and said conduit means further comprises an acceleration unloading valve bypassing said pressure modulator and causing, when energized, condensed liquid refrigerant at full compressor discharge pressure to be delivered to said capacity control slide valve hydraulic motor control port for application to said piston and for shifting said slide valve against said spring bias to full unload position.

13. The system as claimed in claim 9, wheren said capacity control slide valve is spring biased towards full load position and said conduit means further comprises an acceleration unloading valve bypassing said pressure modulator and causing, when energized, condensed liquid refrigerant at full compressor discharge pressure to be delivered to said capacity control slide valve hydraulic motor control port for application to said piston and for shifting said slide valve against said spring bias to full unload position.

14. The system as claimed in claim 10, wherein said capacity control slide valve is spring biased towards full load position and said conduit means further comprises an acceleration unloading valve bypassing said pressure modulator and causing, when energized, condensed liquid refrigerant at full compressor discharge pressure to be delivered to said capacity control slide valve hydraulic motor control port for application to said piston and for shifting said slide valve against said spring bias to full unload position.

15. The system as claimed in claim 1, wherein a heater bypass damper is mounted within said conditioned air flow passage and pivotable between a first position where air flow is prevented from passing over said passive heat exchange means within said conditioned air flow passage and is forced to pass through directly into said cab, and a second position wherein said air flows over said passive heat exchange means, and said system further comprises motor means for shifting said heater bypass damper to and from said first and second positions, a thermosensor positioned within said conditioned air flow passage downstream of said passive heat exchange means and responsive to temperature increase for shifting said heater bypass damper from said first position to said second position.

16. The system as claimed in claim 1, wherein said first bypass means comprises a flow separating wall positioned within said exhaust gas passage for dividing said exhaust gas passage into a first passage section housing the ends of said passive heat exchange means and a second bypass passage section and an exhaust gas passage heater bypass damper mounted at the upstream end of said separating wall and movable between a first position in which said first passage section is closed and said bypass section is open and a second position in which said bypass section is closed and said first section is open, and motor means for moving said exhaust gas passage heater bypass damper to said first or said second positions; whereby, with said damper in said first position, heat exchange between the exhaust gas passage and the conditioned air flow passage is prevented, while in the second position heat exchange between these passages is fully facilitated.

17. The system as claimed in claim 15, wherein said first bypass means comprises a flow separating wall positioned within said exhaust gas passage for dividing said exhaust gas passage into a first passage section housing the ends of said passive heat exchange means and a second bypass passage section and an exhaust gas passage heater bypass damper mounted at the upstream end of said separating wall and movable between a first position in which said first passage section is closed and said bypass section is open and a second position in which said bypass section is closed and said first section is open, and motor means for moving said exhaust gas passage heater bypass damper to said first or said second positions; whereby, with said damper in said first position, heat exchange between the exhaust gas passage and the conditioned air flow passage is prevented, while in the second position heat exchange between these passages is fully facilitated.

18. The system as claimed in claim 16, further comprising a second dividing wall within the portion of said exhaust gas passage bearing the vapor boiler, extending longitudinally therewith, and separating said exhaust gas passage into a first passage section including said vapor boiler and a second bypass section in which air flow bypasses the vapor boiler and wherein said system further comprises a vapor boiler bypass damper pivotally mounted at the upstream end of said second dividing wall for movement between a first position acting to close off the bypass passage and force exhaust gas to pass over the vapor boiler for vaporizing liquid refrigerant within the same and a second position in which the bypass passage section is open and the vapor boiler section is closed to prevent vapor boiler operation, a motor for driving said pivotable bypass damper to said first or said second positions, and a thermosensor within said conduit means leading from said vapor boiler to said cycle control valve for sensing the temperature of the vaporized refrigerant passing from the vapor boiler back to the condenser and operatively coupled to said motor for controlling the position of said vapor boiler bypass damper in response to the temperature of the refrigerant vapor returning from the vapor boiler to the condenser.

19. The system as claimed in claim 17, further comprising a second dividing wall within the portion of said exhaust gas passage bearing the vapor boiler, extending longitudinally therewith, and separating said exhaust gas passage into a first passage section including said vapor boiler and a second bypass section in which air flow bypasses the vapor boiler and wherein said system further comprises a vapor boiler bypass damper pivotally mounted at the upstream end of said second dividing wall for movement between a first position acting to close off the bypass passage and force exhaust gas to pass over the vapor boiler for vaporizing liquid refrigerant within the same and a second position in which the bypass passage section is open and the vapor boiler section is closed to prevent vapor boiler operation, a motor for driving said pivotable bypass damper to said first or said second positions, and a thermosensor within said conduit means leading from said vapor boiler to said cycle control valve for sensing the temperature of the vaporized refrigerant passing from the vapor boiler back to the condenser and operatively coupled to said motor for controlling the position of said vapor boiler bypass damper in response to the temperature of the refrigerant vapor returning from the vapor boiler to the condenser.

20. The system as claimed in claim 7, further comprising a second linear motor for shifting said volume ratio control slide valve between a minimum volume ratio position and a maximum volume ratio position, said linear motor comprising a piston slidably mounted within a cylindrical chamber and open on one side to the discharge pressure at said unit outlet port and on the opposite side to a hydraulic control fluid pressure, and wherein a control line connects the cycle control valve to said other side of said piston with said cycle control valve to selectively provide condensed liquid refrigerant as a control fluid to said second linear motor, and wherein the end face of said slide facing on the side of the discharge port has a surface area which is less than the effective surface area of said one side of said piston such that absent the application of fluid pressure on the other side of said piston, the discharge gas forces the piston to drive said slide valve to its maximum volume ratio position.

21. The system as claimed in claim 20, wherein said volume ratio control slide valve comprises means for sensing the closed thread pressure of the refrigerant working fluid just before discharge from said unit at said outlet port, and said system further comprises means for comparing the closed thread pressure to the outlet port pressure and motor means for shifting said volume ratio control slide valve to a position so as to balance said two pressures to prevent overcompression and undercompression of said working fluid when the unit functions as a compressor and overexpansion and underexpansion when said unit functions as an expander and to thereby match closed thread pressure to the pressure at said system condenser regardless of whether the unit is functioning in compressor or expander mode.

22. A high speed, variable delivery, helical screw compressor/expander unit for use in a refrigeration system and for effecting waste heat recovery, said refrigeration system comprising:
a condenser coil,
an evaporator coil,
a vapor boiler subjected to waste heat for vaporization of a refrigerant working fluid within said boiler,
a prime mover driven helical screw compressor/expander unit including intermeshed helical screw rotors, one of said rotors being connected to said prime mover to be driven thereby during compressor operation and for driving said prime mover during expander operation,
inlet and outlet ports for said compressor/expander unit,
a capacity control slide valve for said compressor/expander unit operatively controlling working fluid inlet to said unit at said inlet port,
a volume ratio control slide valve for said compressor/expander unit operatively controlling unit working fluid discharge at said outlet port,
conduit means carrying a refrigerant working fluid and fluid connecting said vapor boiler, said compressor/expander unit at said inlet and outlet ports, said condenser and said evaporator in a closed loop refrigeration and vapor power circuit, said conduit means including a cycle control valve for controlling said unit to permit said unit to act selectively as compressor or expander, for selectively directing working fluid to said vapor boiler or to said evaporator coil,
the improvement wherein:
said conduit means and said cycle control valve comprise means for delivery of refrigerant working fluid in vapor form from said vapor boiler or from said evaporator coil to operate said unit as an expander or a compressor, respectively, and for driving said helical screw rotor in the same direction regardless of whether said prime mover drives said unit or is driven thereby,
means for biasing said capacity control slide valve towards a first fully loaded position,
means responsive to system operation for refrigeration loop system operation for shifting said capacity control slide valve in an opposite direction, towards unload position regardless of whether said unit functions as compressor or expander,
means for shifting said volume ratio control slide valve in a first direction towards maximum volume ratio for said helical screw compressor/expander unit to maximize efficiency of said unit when acting as a compressor and for selectively shifting said volume ratio control slide valve in the opposite direction towards a minimum volume ratio when said unit functions as an expander to permit maximum expansion of the heated vapor returning from said vapor boiler to said inlet port through said cycle control valve.

23. The high speed, variable delivery, helical screw compressor/expander unit for use in a refrigeration system and for effecting waste heat recovery, as claimed in claim 22, wherein said volume ratio control slide valve comprises means for measuring the closed thread pressure of the working fluid just before discharge through said outlet port, and said system further comprises means for measuring the discharge pressure of said working fluid at said discharge port, and means for shifting the volume ratio slide valve to a position to equalize the pressures to match operation of said compressor/expander unit regardless of whether it is functioning as a compressor or an expander to condensing temperature of said working fluid within said condenser coupled via said cycle control valve to the outlet side of said compressor/expander unit.

* * * * *